(12) United States Patent
Bae (10) Patent No.: US 11,216,596 B2
(45) Date of Patent: Jan. 4, 2022

(54) SEMICONDUCTOR SYSTEM CAPABLE OF SCRAMBLING ADDRESSES

(71) Applicant: SK hynix Inc., Icheon-si (KR)

(72) Inventor: Ji Hyae Bae, Hwaseong-si (KR)

(73) Assignee: SK hynix Inc., Icheon-si (KR)

( * ) Notice: Subject to any disclaimer, the term of this patent is extended or adjusted under 35 U.S.C. 154(b) by 112 days.

(21) Appl. No.: 16/686,601

(22) Filed: Nov. 18, 2019

(65) Prior Publication Data

US 2020/0265171 A1 Aug. 20, 2020

(30) Foreign Application Priority Data

Feb. 20, 2019 (KR) .................. 10-2019-0019706

(51) Int. Cl.
*G06F 21/72* (2013.01)
*G06F 21/79* (2013.01)
*G06F 12/02* (2006.01)

(52) U.S. Cl.
CPC .......... *G06F 21/79* (2013.01); *G06F 12/0284* (2013.01); *G06F 12/0292* (2013.01); *G06F 21/72* (2013.01)

(58) Field of Classification Search
CPC ...... G06F 21/79; G06F 21/72; G06F 12/0284; G06F 12/0292; G06F 2212/1052; G11C 2029/1806
See application file for complete search history.

(56) References Cited

U.S. PATENT DOCUMENTS

| 5,943,283 | A | * | 8/1999 | Wong | ..................... | G06F 21/79 |
| | | | | | | 365/230.01 |
| 6,094,738 | A | * | 7/2000 | Yamada | ................. | G01R 31/28 |
| | | | | | | 714/718 |
| 9,679,642 | B2 | | 6/2017 | Liu et al. | | |

(Continued)

FOREIGN PATENT DOCUMENTS

KR    1020190124578 A    11/2019

OTHER PUBLICATIONS

"Address and Data Scrambling: Causes and Impact on Memory Tests"—van de Gooret al, IEEE International Workshop on Electronic Design, Test and Applications (Delta '02), Jul. 2002 https://citeseerx.ist.psu.edu/viewdoc/download?doi=10.1.1.5.9722&rep=rep1&type=pdf (Year: 2002).*

(Continued)

*Primary Examiner* — Randy A Scott
(74) *Attorney, Agent, or Firm* — William Park & Associates Ltd.

(57) ABSTRACT

A semiconductor system in accordance with an embodiment includes a module controller and a plurality of semiconductor chips configured to receive logical addresses from the module controller. The semiconductor system also includes a plurality of scramble circuits, with a scramble circuit provided for each of the plurality of semiconductor chips, configured to receive the logical addresses and to output corresponding physical addresses for the plurality of semiconductor chips. Each scramble circuit of the plurality of scramble circuits is configured to receive the same logical address and to output a corresponding physical address different from the physical addresses output by the other scramble circuits of the plurality of scramble circuits.

16 Claims, 11 Drawing Sheets

(56) References Cited

U.S. PATENT DOCUMENTS

| | | | |
|---|---|---|---|
| 2009/0204824 A1* | 8/2009 | Lin .................... | G11B 20/0021 |
| | | | 713/193 |
| 2013/0329508 A1* | 12/2013 | Ashburn ............ | G01R 31/3177 |
| | | | 365/200 |
| 2017/0206030 A1* | 7/2017 | Woo .................... | G06F 12/1408 |

OTHER PUBLICATIONS

"Virtual Memory and Address Translation"—Dept. of Computer Science, University of Texas, Mar. 9, 2011 https://www.cs.utexas.edu/users/witchel/372/lectures/15.VirtualMemory.pdf (Year: 2011).*

* cited by examiner

SEMICONDUCTOR SYSTEM CAPABLE OF SCRAMBLING ADDRESSES

CROSS-REFERENCES TO RELATED APPLICATION

The present application claims priority under 35 U.S.C. § 119(a) to Korean application number 10-2019-0019706, filed on Feb. 20, 2019, in the Korean Intellectual Property Office, which is incorporated herein by reference in its entirety.

BACKGROUND

1. Technical Field

Various embodiments generally relate to a semiconductor system, and more particularly, to a semiconductor system capable of scrambling addresses.

2. Related Art

Generally, a semiconductor memory device may include a plurality of memory cells divided into a plurality of groups. Memory cells may be controlled by the group. A memory cell group may be referred to as a memory cell array or a MAT. A control block may be arranged at a boundary between memory cell arrays. The memory cell arrays may be controlled separately by the control block.

A difference between signal transmission characteristics may be generated between a memory cell adjacent to the control block (hereinafter, referred to as an adjacent cell) and a memory cell remote from the control block (hereinafter, referred to as a far cell). Particularly, in a cross point array using a phase changeable material as a switching element and a storage medium, an error may be frequently generated in the adjacent cell.

Meanwhile, an error-bit test of a semiconductor integrated circuit device may be performed on a semiconductor chip unit, a bank unit, or a MAT unit. The error-bit test may be simultaneously performed on the semiconductor chips, the banks, and the MATs. When the adjacent cell is tested, an error ratio in the adjacent cell may be remarkably increased as compared to other regions. Although the errors in the adjacent cell region may not to a worrisome level in view of the bank and the MAT, the instantaneous increase of the error ratio may cause low yield of the semiconductor chip, the bank, and the MAT.

SUMMARY

In accordance with an embodiment of the present disclosure, a semiconductor system includes a module controller and a plurality of semiconductor chips configured to receive logical addresses from the module controller. The semiconductor system also includes a plurality of scramble circuits, with a scramble circuit provided for each of the plurality of semiconductor chips, configured to receive the logical addresses and to output corresponding physical addresses for the plurality of semiconductor chips. Each scramble circuit of the plurality of scramble circuits is configured to receive the same logical address and to output a corresponding physical address different from the physical addresses output by the other scramble circuits of the plurality of scramble circuits.

In accordance with another embodiment of the present disclosure, a semiconductor system includes a module substrate and a plurality of semiconductor chips mounted on the module substrate. The semiconductor system also includes a module controller configured to provide each of the semiconductor chips with logical addresses and address bit test commands. The semiconductor system further includes scramble circuits, with a scramble circuit provided for each of the semiconductor chips, the scramble circuits configured to convert the logical addresses into physical addresses based on the address bit test commands. The scramble circuits are configured to generate a different physical addresses for each semiconductor chip given the same logical address.

BRIEF DESCRIPTION OF THE DRAWINGS

The above and other aspects, features, and advantages of the subject matter of the present disclosure will be more clearly understood from the following detailed description taken in conjunction with the accompanying drawings, in which.

DETAILED DESCRIPTION

Various embodiments of the present teachings are described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present teachings as defined in the appended claims.

The present teachings are described herein with reference to cross-section and/or plan illustrations of idealized embodiments. However, described and/or illustrated embodiments of the present teachings should not be construed as limiting the present teachings. Although a few embodiments of the present teachings are shown and described, it will be appreciated by those of ordinary skill in the art that changes may be made in these embodiments without departing from the principles and spirit of the present teachings.

Figure 1:
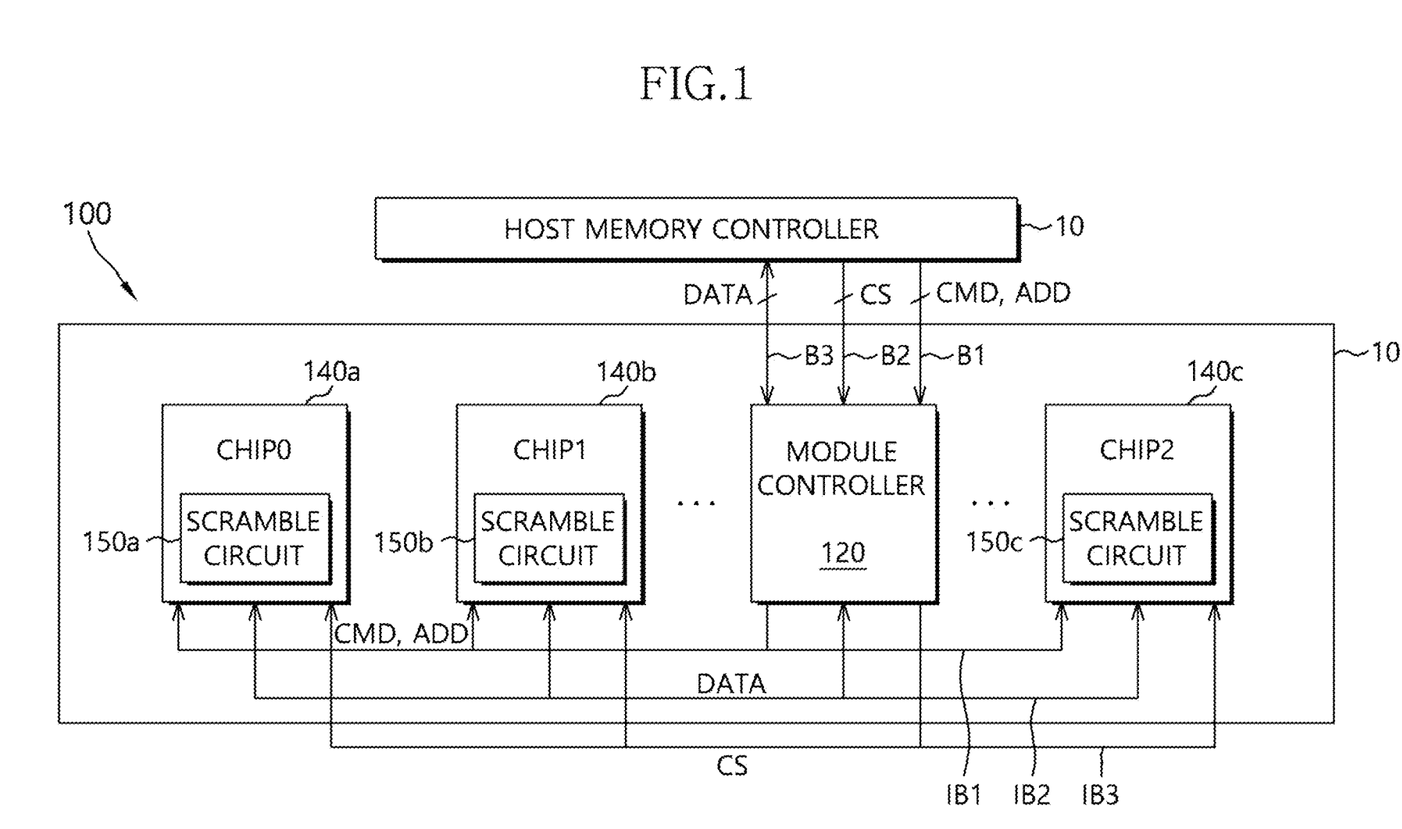
FIG. 1 is a block diagram illustrating a semiconductor module in accordance with an embodiment.

FIG. 1 is a block diagram illustrating a semiconductor module in accordance with an embodiment.

Referring to FIG. 1, a semiconductor module 100 may include a module substrate 101, a module controller 120, and a plurality of semiconductor chips 140a~140c. As used herein, the tilde "~" indicates a range of components. For example, "140a~140c" indicates the semiconductor chips 140a, 140b, and 140c shown in FIG. 1.

For example, the semiconductor module 100 may include a dual in-line memory module (DIMM).

The module controller 120 may receive a command CMD and an address ADD from a host memory controller 10 through a control bus B1. The module controller 120 may receive chip selection signals CS from the host memory controller 10 through a rank selection bus B2. The module controller 120 may transmit/receive data DATA to/from the host memory controller 10 through a data bus B3. That is, the module controller 120 may function as an interface between the semiconductor chips 140a~140c and the host memory controller 10. The module controller 120 may buffer the command CMD, the address ADD, and the chip selection signals CS provided from the host memory controller 10. The module controller 120 may then transmit the buffered command CMD, the buffered address ADD, and the buffered chip selection signals CS to the semiconductor chips 140a~140c. Further, the module controller 120 may control input timings of the signals CMD, ADD, and CS transmitted to the semiconductor chips 140a~140c through an internal bus lines IB1 or IB3. The module controller 120 may transmit/receive the data DATA to/from the semiconductor chips 140a~140c through an internal bus line IB2.

Each of the semiconductor chips 140a~140c may include any one of various memories such as a dynamic random access memory (DRAM), a phase change random access memory (PCRAM), etc. In an embodiment, the semiconductor module 100 may include the three semiconductor chips 140a~140c.

Each of the semiconductor chips 140a~140c may include each of scramble circuits 150a~150c, respectively. Each of the scramble circuits 150a~150c may receive the address ADD, for example, a logical address inputted from the module controller 120 to generate various physical addresses by the semiconductor chips 140a~140c. For example, the scramble circuits 150a~150c may be arranged in a control block of the semiconductor chips 140a~140c, for example, a state machine.

Figure 2:
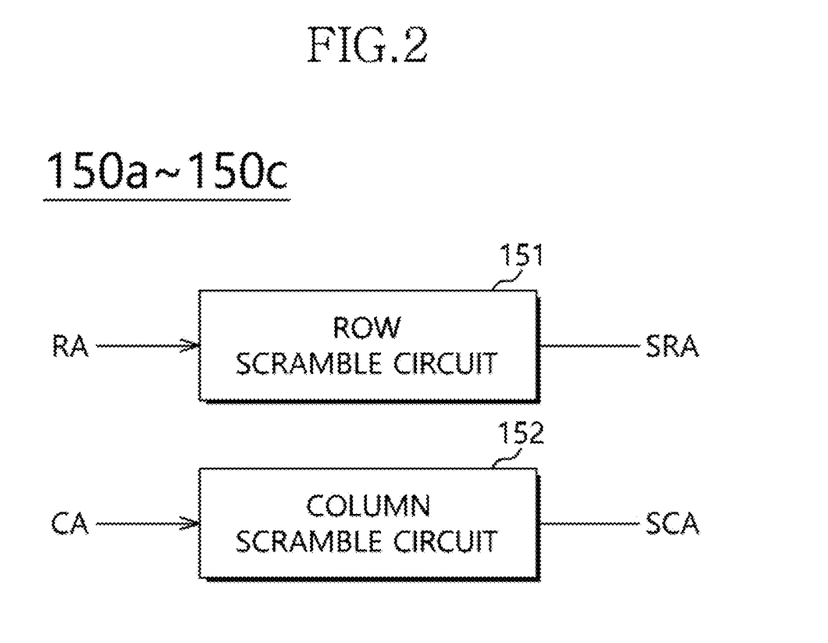
FIG. 2 is a block diagram illustrating a scramble circuit in accordance with an embodiment.
Figure 3:
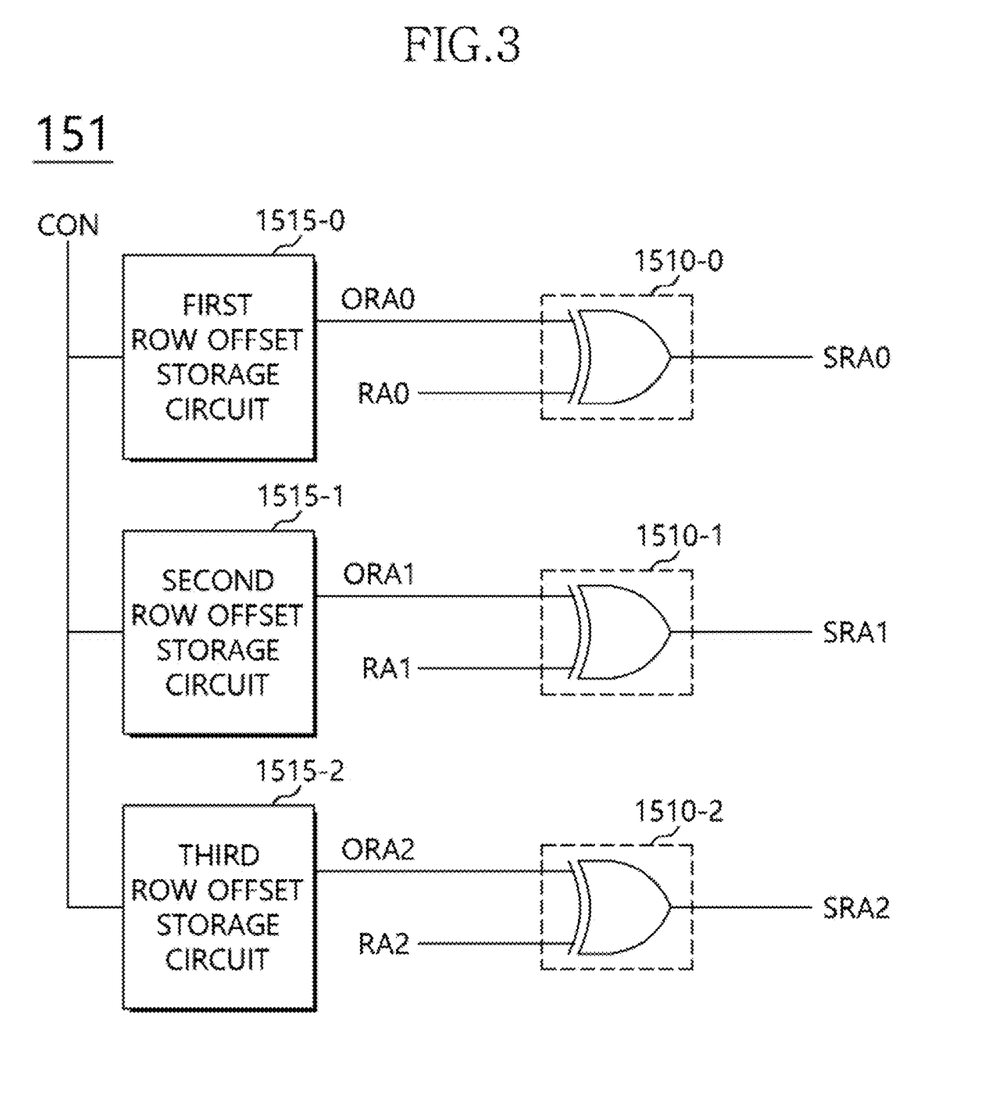
FIG. 3 is a circuit diagram illustrating a row scramble circuit of FIG. 2.
Figure 4:
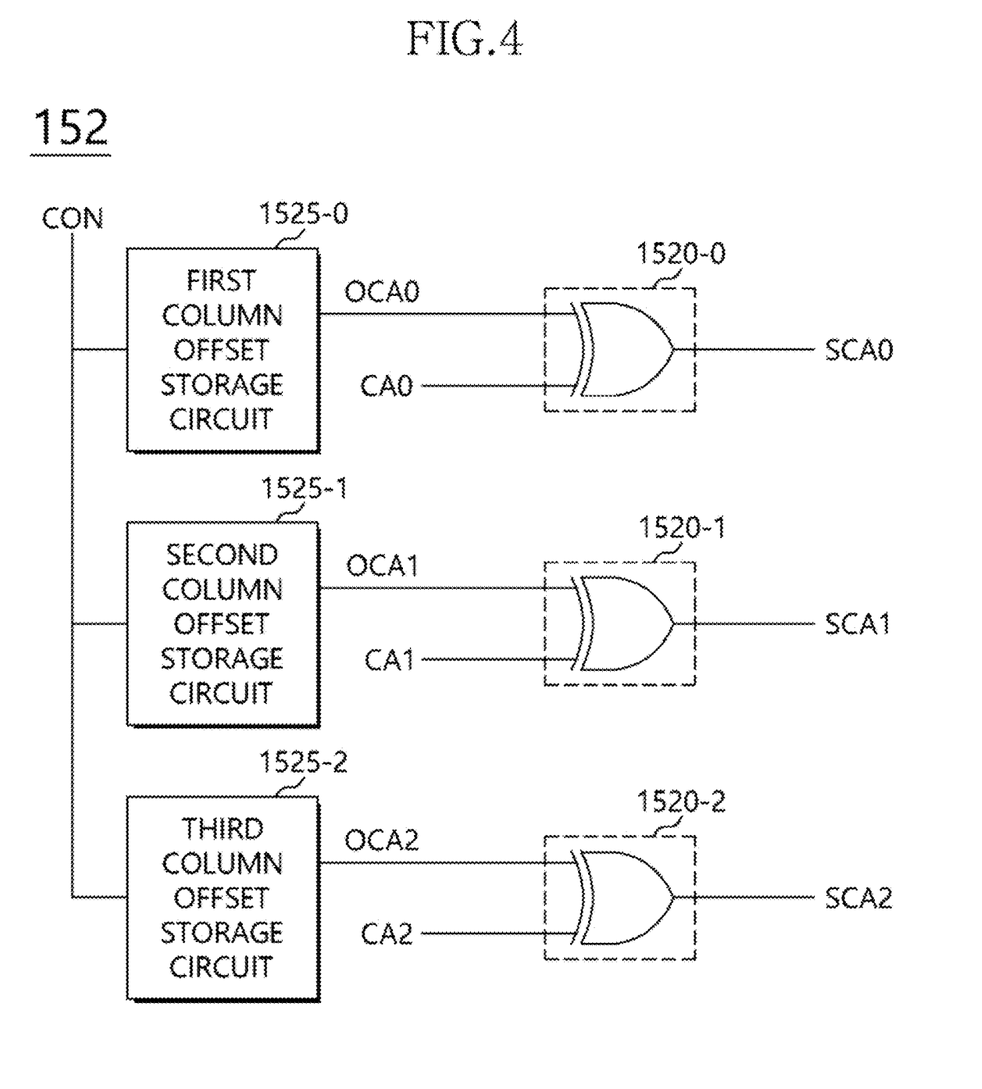
FIG. 4 is a circuit diagram illustrating a column scramble circuit of FIG. 2.

FIG. 2 is a block diagram illustrating a scramble circuit in accordance with an embodiment, FIG. 3 is a circuit diagram illustrating a row scramble circuit in FIG. 2, and FIG. 4 is a circuit diagram illustrating a column scramble circuit in FIG. 2.

Referring to FIG. 2, each of the scramble circuits 150a~150c may include a row scramble circuit 151 and a column scramble circuit 152.

The row scramble circuit 151 may receive a row address RA among the addresses provided from the module controller 120 to generate a scrambled row address SRA.

The column scramble circuit 152 may receive a column address CA among the addresses provided from the module controller 120 to generate a scrambled column address SCA.

Referring to FIG. 3, the row scramble circuit 151 may include a plurality of row scramble logic circuits 1510-0~1510-2 and a plurality of row offset storage circuits 1515-0~1515-2. Numbers of the row scramble logic circuits 1510-0~1510-2 and numbers of the row offset storage circuits 1515-0~1515-2 may correspond to numbers of bits in the row address RA. For example, the row address may include three bit addresses RA0~RA2 and the column address may include three bit addresses CA0~CA2.

The first row scramble logic circuit 1510-0 may receive a first bit RA0 of the row address and a first offset row address bit ORA0 in the first row offset storage circuit 1515-0 to output a first bit signal SRA0 of the scramble row address.

The second row scramble logic circuit 1510-1 may receive a second bit RA1 of the row address and a second offset row address bit ORA1 in the second row offset storage circuit 1515-1 to output a second bit signal SRA1 of the scramble row address.

The third row scramble logic circuit 1510-2 may receive a third bit RA2 of the row address and a third offset row address bit ORA2 in the third row offset storage circuit 1515-2 to output a third bit signal SRA2 of the scramble row address.

Combinations of the output signals SRA0, SRA1, and SRA2 of the first to third row scramble logic circuits 1510-0~1510-2 may be physical row address for selecting word lines on the semiconductor chips 140a~140c. For example, a first bit of the physical row address may be the SRA0, a second bit of the physical row address may be the SRA1, and a third bit of the physical row address may be the SRA2.

For example, the first to third row scramble logic circuits 1510-0~1510-2 may include an exclusive OR (XOR) gate. For example, when the row address bits RA0~RA2 may be substantially the same as the offset row address bits ORA0~ORA2, the row scramble logic circuits 1510-0~1510-2 may output a low level of a signal as the scrambled row address bit. In contrast, when the row address bits RA0~RA2 may be different from the offset row address bits ORA0~ORA2, the row scramble logic circuits 1510-0~1510-2 may output a high level of a signal as the scrambled row address bit.

The first to third row offset storage circuits 1515-0~1515-2 may include a register. The first to third row offset storage circuits 1515-0~1515-2 may selectively provide the row scramble logic circuits 1510-0~1510-2 with the offset row address bits ORA0~ORA2 in response to a control signal CON. The control signal CON may include a mode register set (MRS) command or a signal using a fuse. The control signal CON may be a command signal for enabling an address bit test mode. The control signal CON may be provided from the module controller 120. When an address scramble may be required, the control signal CON may be enabled in operating the address bit test to drive the row scramble circuit 151.

Further, information in the row offset storage circuits 1515-0~1515-2 may be different from each other by the semiconductor chips 140a~140c to select the word lines at different positions in the semiconductor chips 140a~140c.

Referring to FIG. 4, the column scramble circuit 152 may have configurations substantially the same as those of the row scramble circuit 151. That is, the column scramble circuit 152 may include column scramble logic circuits 1520-0~1520-2 corresponding to numbers of column address bits, and column offset storage circuits 1525-0~1525-2 corresponding to numbers of column address bits.

Each of the column scramble logic circuits 1520-0~1520-2 may receive column address bits CA0~CA2 and offset column address bits OCA0~OCA2 in the column offset storage circuits 1525-0~1525-2 to output scrambled column address bits SCA0~SCA2.

Further, information in the column offset storage circuits 1525-0~1525-2 may be different from each other by the semiconductor chips 140a~140c to select the bit lines at different positions in the semiconductor chips 140a~140c.

Figure 5:
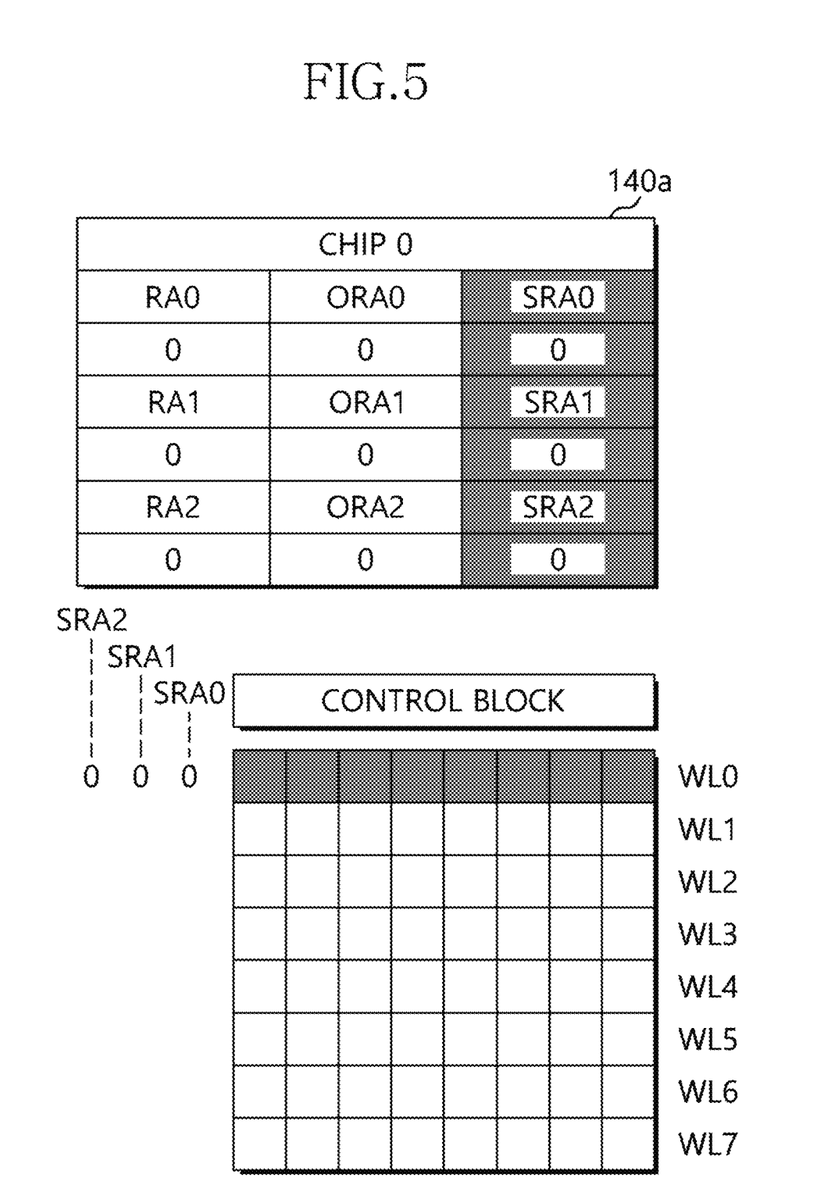
FIGS. 5, 6, and 7 are diagrams illustrating a row address scramble operation in accordance with an embodiment.
Figure 6:
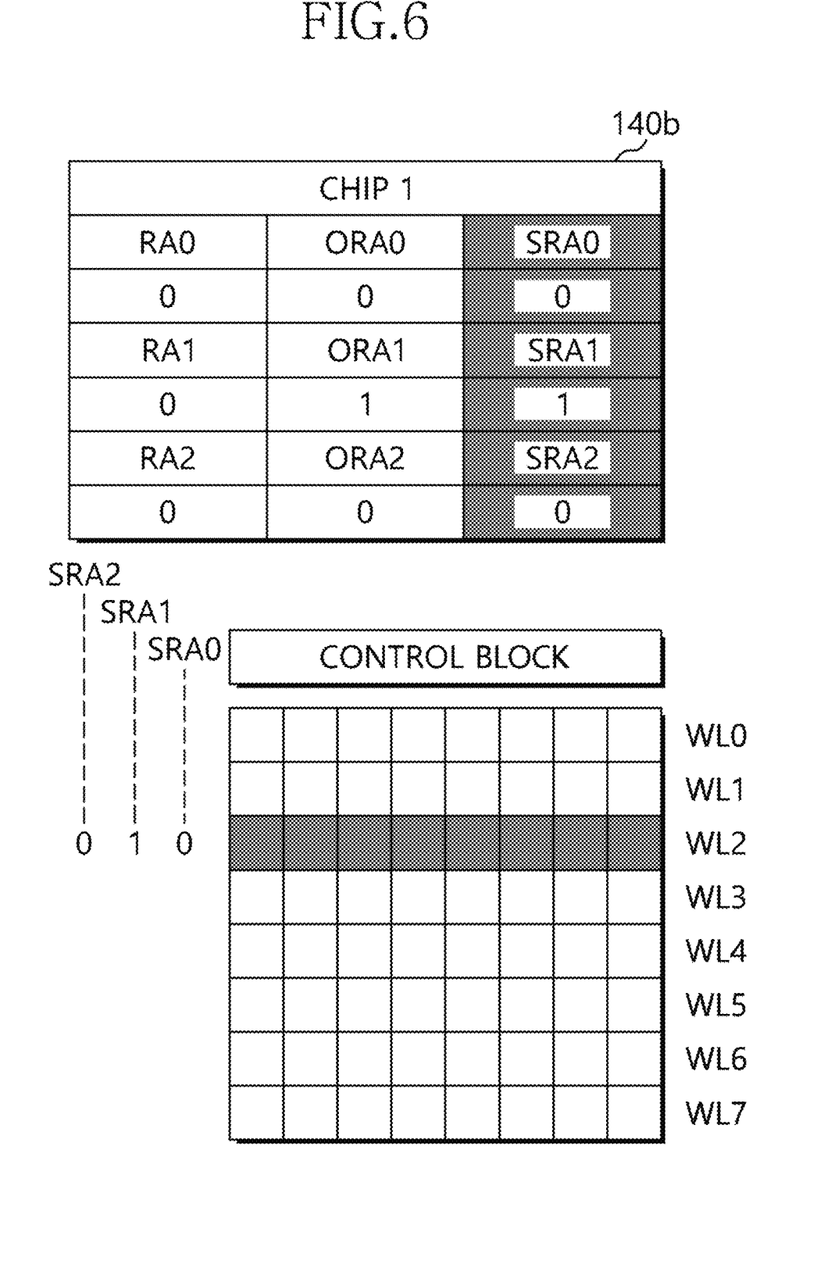
Figure 7:
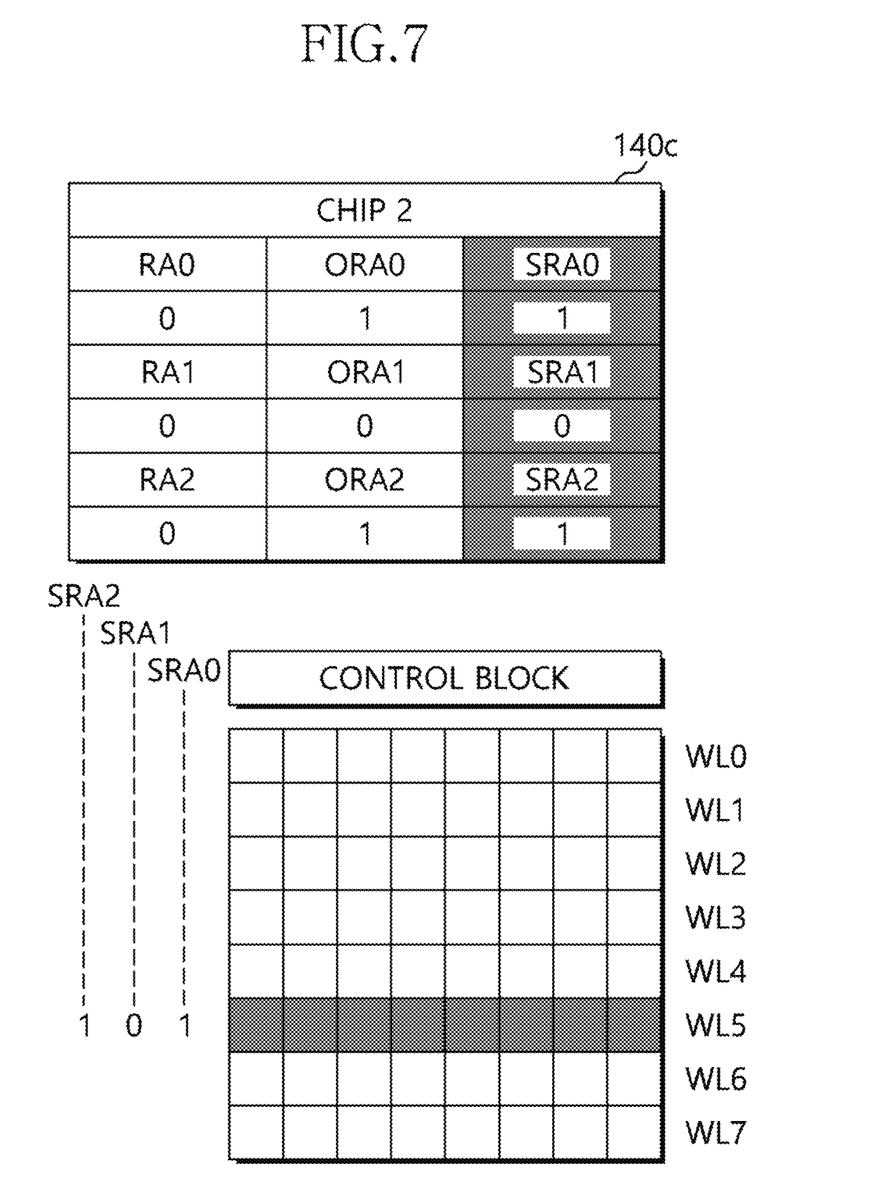

FIGS. 5 to 7 illustrate a row address scramble operation in accordance with an embodiment.

For example, the first to third row offset storage circuits 1515-0~1515-2 of the first semiconductor chips 140a may store "0" of data as the first to third bits ORA0, ORA1, and ORA2 of the offset row address. The first to third row offset storage circuits 1515-0~1515-2 of the second semiconductor chips 140b may store "0", "1", and "0" of data as the first to third bits ORA0, ORA1, and ORA2 of the offset row address. The first to third row offset storage circuits 1515-0~1515-2 of the third semiconductor chips 140c may store "1", "0", and "1" of data as the first to third bits ORA0, ORA1, and ORA2 of the offset row address. The logical row address having "000" as address bits may be inputted into the first to third semiconductor chips 140a~140c from the module controller 120.

The first to third row scramble logic circuits 1510-0~1510-2 of the first semiconductor chip 140a may perform the exclusive OR operation of the offset row address bits ORA0, ORA1, and ORA2 (for example, "000") and the logical row address bits RA0, RA1, and RA2 (for example, "000") in the first to third row offset storage circuits 1515-0~1515-2 to output the scrambled row addresses bits SRA0, SRA1, and SRA2 (for example, "000"). Thus, as shown in FIG. 5, the scrambled row addresses including the scrambled address bits SRA0, SRA1, and SRA2 may be a physical row address for selecting a word line in the first semiconductor chip 140a. The physical row address including "000" address bits may be decoded by a row decoding circuit in the first semiconductor chip 140a. A first word line WL0 in the first semiconductor chip 140a corresponding to the physical row address including the "000" address bits may be selected.

Referring to FIG. 6, the first to third row scramble logic circuits 1510-0~1510-2 of the second semiconductor chip 140b may perform the exclusive OR operation of the offset row address bits (for example, "010") in the first to third row offset storage circuits 1515-0~1515-2 of the second semiconductor chip 140b and the logical row address bits RA0, RA1, and RA2 (for example, "000") to output the scrambled row addresses bits SRA0, SRA1, and SRA2 (for example, "010"). The scrambled row address having the "010" scrambled address bits may be inputted into the second semiconductor chip 140b as the physical row address. The "010" address bits of the physical row address may be decoded by a row decoding circuit (not shown) in the second semiconductor chip 140b. A third word line WL2 in the second semiconductor chip 140b corresponding to the physical row address including the "010" address bits may be selected.

Referring to FIG. 7, the first to third row scramble logic circuits 1510-0~1510-2 of the third semiconductor chip 140c may perform the exclusive OR operation of the offset row address bits (for example, "101") in the first to third row offset storage circuits 1515-0~1515-2 of the third semiconductor chip 140c and the logical row address bits RA0, RA1, and RA2 (for example, "000") to output the scrambled row address bits SRA0, SRA1, and SRA2 (for example, "101"). The scrambled row address bits SRA0, SRA1, and SRA2 (for example, "101") may be inputted into the third semiconductor chip 140c as the physical row address. The physical row address including the "101" address bits may be decoded by a row decoding circuit in the third semiconductor chip 140c. A sixth word line WL5 in the third semiconductor chip 140c corresponding to the physical row address including the "101" address bits may be selected.

When the logical row address including the "000" address bits for selecting the first word line WL0 adjacent to the control block may be inputted into the semiconductor chips 140a~140c, the first semiconductor chip 140a may select the first word line WL0 corresponding to the logical row address including the "000" address bits. The second and third semiconductor chips 140b and 140c may select the third word line WL2 and the sixth word line WL5, respectively, by the operations of the scramble circuits 150b and 150c. Therefore, each of the semiconductor chips 140a~140c may select the word lines corresponding to the different physical row addresses with respect to the logical row address including the "000" address bits.

Figure 8:
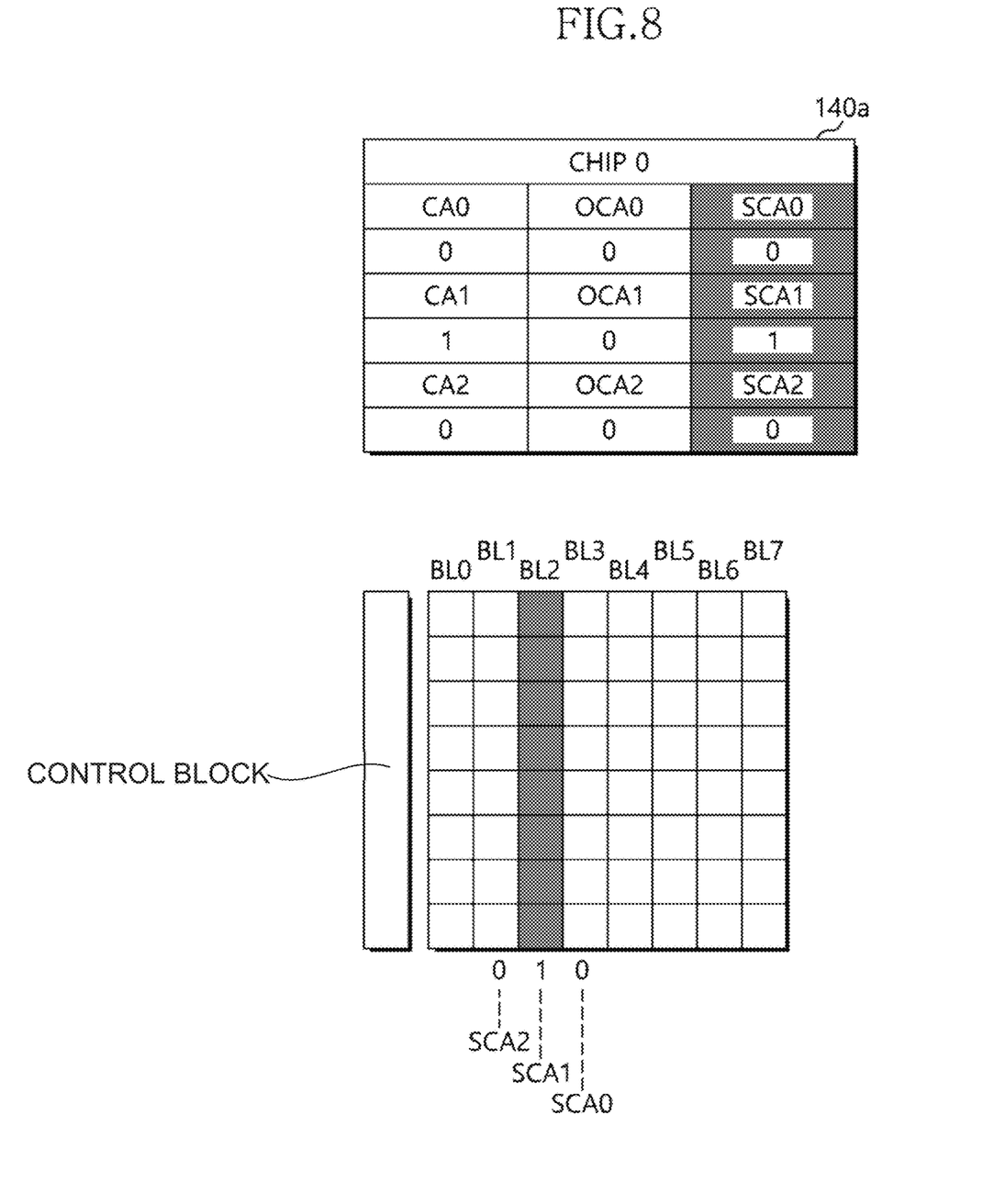
FIGS. 8, 9, and 10 are diagrams illustrating a column address scramble operation in accordance with an embodiment.
Figure 9:
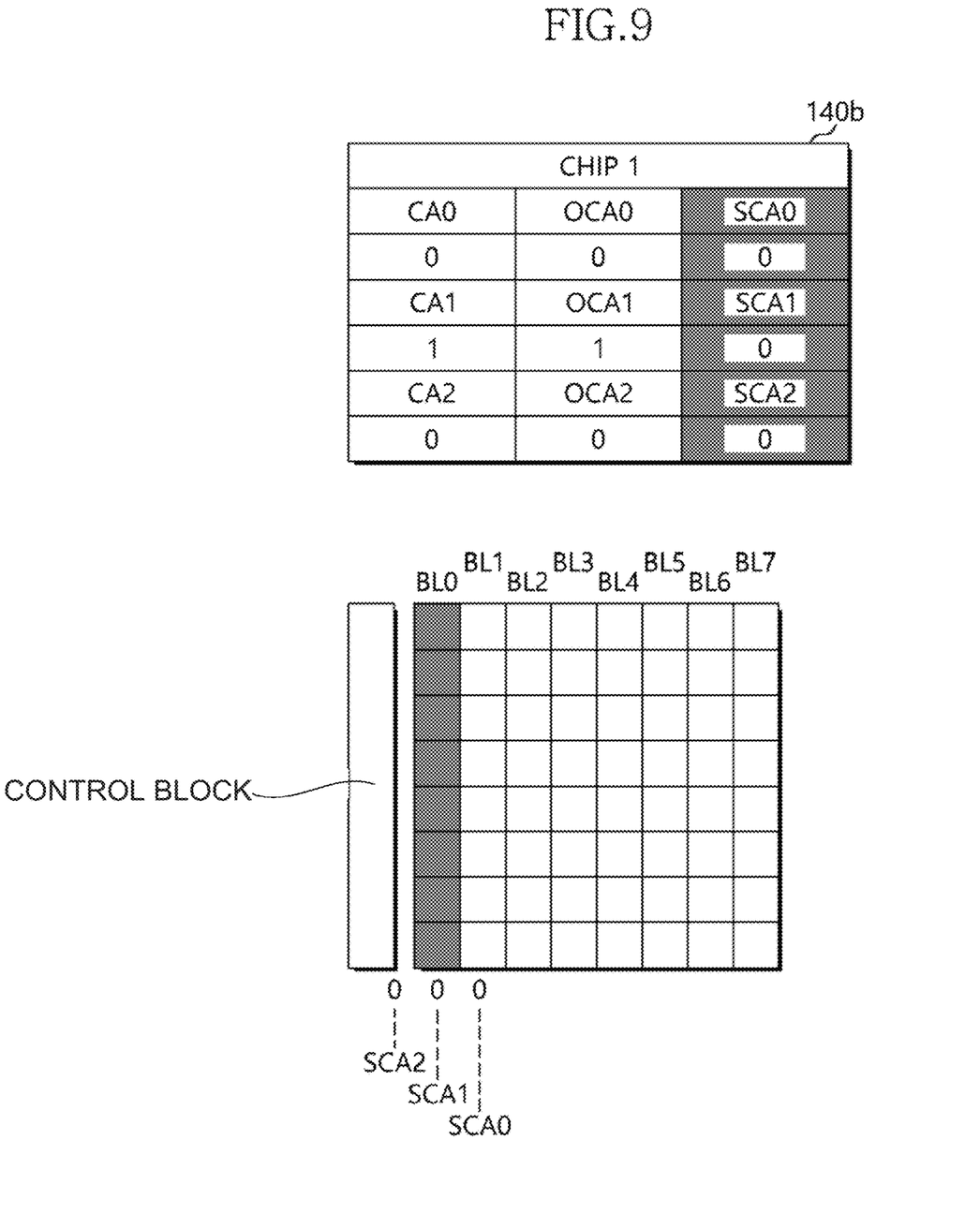
Figure 10:
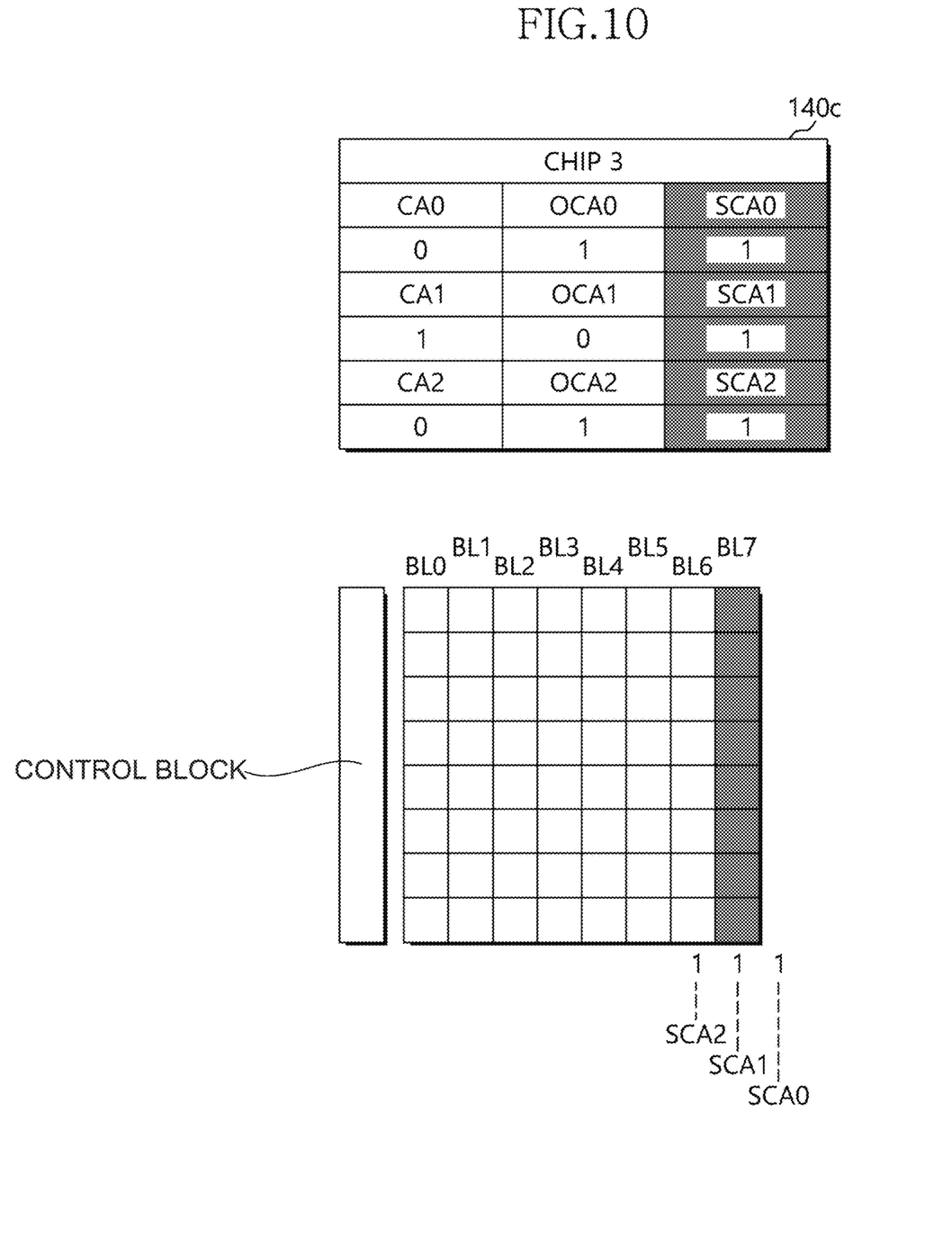

FIGS. 8 to 10 illustrate a column address scramble operation in accordance with an embodiment.

For example, the first to third column offset storage circuits 1525-0~1525-2 of the first semiconductor chips 140a may store "0" of data as the first to third bits OCA0, OCA1, and OCA2 of the offset column address. The first to third column offset storage circuits 1525-0~1525-2 of the second semiconductor chips 140b may store "0", "1", and "0" of data as the first to third bits OCA0, OCA1, and OCA2 of the offset column address. The first to third column offset storage circuits 1525-0~1525-2 of the third semiconductor chips 140c may store "1", "0", and "1" of data as the first to third bits OCA0, OCA1, and OCA2 of the offset column address. The logical column address having "010" as address bits may be inputted into the first to third semiconductor chips 140a~140c from the module controller 120.

Referring to FIG. 8, the first to third column scramble logic circuits 1520-0~1520-2 of the first semiconductor chip 140a may perform the exclusive OR operation of the offset column address bits OCA0, OCA1, and OCA2 (for example, "000") and the logical column address bits CA0, CA1, and CA2 (for example, "010") in the first to third column offset storage circuits 1525-0~1525-2 to output the scrambled column addresses bits SCA0, SCA1, and SCA2 (for example, "010"). Thus, the scrambled column addresses bits SCA0, SCA1, and SCA2 (for example, "010") address bit may be a physical column address for selecting a bit line in the first semiconductor chip 140a. The "010" address bits of the physical column address may be decoded by a column decoding circuit in the first semiconductor chip 140a. A third bit line BL2 in the first semiconductor chip 140a corresponding to the "010" address bits of the physical column address may be selected. The address scramble may not be generated, because the offset column address bits OCA0, OCA1, and OCA2 may be all of "0".

Referring to FIG. 9, the first to third column scramble logic circuits 1520-0~1520-2 of the second semiconductor chip 140b may perform the exclusive OR operation of the offset column address bits (for example, "010") in the first to third column offset storage circuits 1525-0~1525-2 of the second semiconductor chip 140b and the logical column address bits CA0, CA1, and CA2 (for example, "010") to output the scrambled column addresses bits SCA0, SCA1, and SCA2 including "000" address bits. The scrambled column address having the "000" scrambled address bits may be inputted into the second semiconductor chip 140b as the physical column address. A first bit line BL0 in the second semiconductor chip 140b corresponding to the physical column address including "000" address bits may be selected.

Referring to FIG. 10, the first to third column scramble logic circuits 1520-0~1520-2 of the third semiconductor chip 140c may perform the exclusive OR operation of the offset column address bits (for example, 101) in the first to third column offset storage circuits 1525-0~1525-2 of the third semiconductor chip 140c and the logical column address bits CA0, CA1, and CA2 (for example, "010") to output the scrambled column address bits SCA0, SCA1, and SCA2 (for example, "111"). The scrambled column address bits SCA0, SCA1, and SCA2 (for example, "111") may be inputted into the third semiconductor chip 140*c* as the physical column address. An eighth bit line BL7 in the third semiconductor chip 140*c* corresponding to the physical column address including the "111" address bits may be selected.

As a result, each of the semiconductor chips 140*a*~140*c* may select the bit lines corresponding to the different physical column addresses with respect to the logical column address including the "010" address bits.

According to example embodiments, the different physical addresses by the semiconductor chips with respect to the selected logical address may be selected by the scramble circuits 150*a*~150*c* in the semiconductor chips 140*a*~140*c*. Therefore, when the memory cell adjacent to the control block may be tested, an error generation ration may not be concentrated.

Figure 11A:
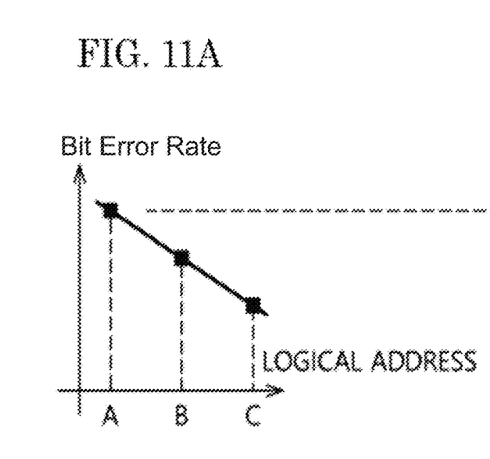
FIGS. 11A, 11B, and 11C are graphs showing bit error rates in accordance with positions of semiconductor chips.
Figure 11B:
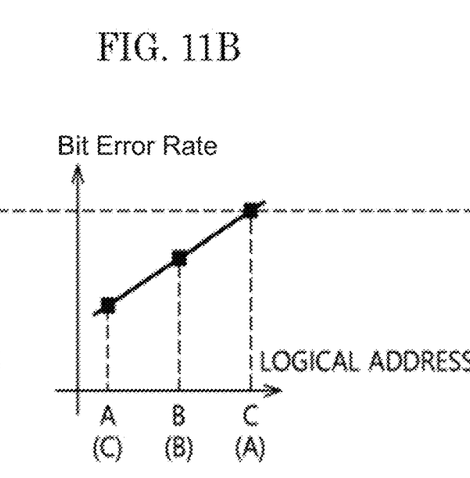
Figure 11C:
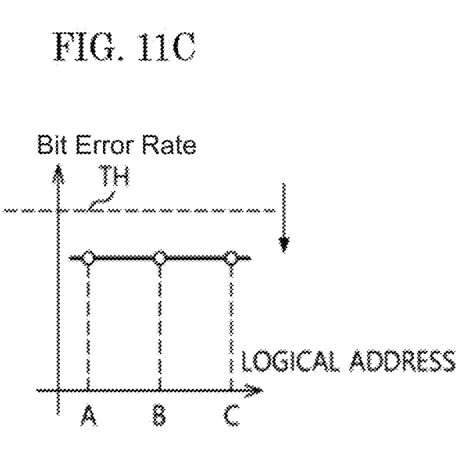

FIGS. 11A, 11B, and 11C are graphs showing bit error rates (BERs) in accordance with positions of semiconductor chips. FIG. 11A shows a BER of the first semiconductor chip 140*a*, and FIG. 11B shows a BER of the second semiconductor chip 140*b*.

When the module controller 120 or the host memory controller transmits the bit error test command, for example, transmits the control signal CON to each of the addresses of the semiconductor chips 140*a*~140*c*, the error bit test of the address may be performed.

Because the offset address for not changing the logical address may be stored in the scramble circuit 150*a* of the first semiconductor chip 140*a*, the logical address may correspond to the physical address of the first semiconductor chip 140*a*. Thus, the bit error ratio of the first semiconductor chip 140*a* may be sequentially decreased from an "A" region, which is adjacent to the control block, to a "C" region, which is remote from the control block, through a "B" region between the "A" region and "C" region.

The scramble circuit 150*b* of the second semiconductor chip 140*b* may generate the physical address at a position different from that of the logical address. Thus, as shown in FIG. 11B, although the logical address may direct a memory cell positioned in the "A" region, the physical address of the second semiconductor chip 140*b* may direct a memory cell positioned in the "C" region. Further, although the logical address may direct a memory cell positioned in the "C" region, the physical address of the second semiconductor chip 140*b* may direct a memory cell positioned in the "A" region. (A), (B), and (C) in FIG. 11B may indicate the physical addresses. Therefore, the bit error ratio of the second semiconductor chip 140*b* may be contrary to the bit error ratio of the first semiconductor chip 140*a*.

FIG. 11C represents BER (bit error ratio) scramble results of the first and second semiconductor chips 140*a* and 140*b*.

Referring to FIGS. 11A to 11C, an error generation frequency in the "A" of the first semiconductor chip 140*a* may be higher than that in the "B" of the second semiconductor chip 140*b*. Thus, when the BER results of the first and second semiconductor chips 140*a* and 140*b* are scrambled, an average BER of the first and second semiconductor chips 140*a* and 140*b* may be downwardly standardized to the BER of the second region (B).

Therefore, determining the semiconductor chip to be abnormal, which may be caused by temporarily increasing the error ratio of no less than a critical value (TH) due to the error concentration on a specific region, may be prevented. While two semiconductor chips are used in describing the scramble principle with respect to FIGS. 11A to 11C, other embodiments are not limited to any specific number of semiconductor chips.

The above-described embodiments are intended to illustrate and not to limit the present teachings. Various alternative and equivalent embodiments are possible. The present teachings are not limited by the embodiments described herein. Nor are the present teachings limited to any specific type of semiconductor device. Other additions, subtractions, or modifications of the present teachings are intended to fall within the scope of the appended claims.

What is claimed is:

1. A semiconductor system comprising:
  a module controller;
  a plurality of semiconductor chips configured to receive logical addresses and address bit test commands from the module controller, each of the plurality of semiconductor chips including a control block and a memory cell region with a first cell region arranged adjacent to the control block, a second cell region arranged farther away from the control block than the first cell region, and a third cell region arranged farther away from the control block than the second cell region; and
  a plurality of scramble circuits, with a scramble circuit provided for each of the plurality of semiconductor chips, configured to receive the logical addresses and to output corresponding physical addresses using the address bit test commands for the plurality of semiconductor chips, wherein each scramble circuit of the plurality of scramble circuits is configured to receive the same logical address and to output a corresponding physical address different from the physical addresses output by the other scramble circuits of the plurality of scramble circuits, wherein the plurality of scramble circuits is configured to output the scramble addresses to be matched to the number of the semiconductor chips for selecting a memory cell located at the first cell region with the number of the semiconductor chips for selecting a memory cell located at the third cell region.

2. The semiconductor system of claim 1, wherein a scramble circuit provided in a selected one of the plurality of semiconductor chips outputs a physical address corresponding to the logical address.

3. The semiconductor system of claim 1, wherein each scramble circuit comprises:
  a row scramble circuit configured to receive a logical row address among the logical addresses and to output a scrambled row address as a physical row address; and
  a column scramble circuit configured to receive a logical column address among the logical addresses and to output a scrambled column address as a physical column address.

4. The semiconductor system of claim 3, wherein the row scramble circuit comprises:
  a plurality of row offset storage circuits configured to store offset row address bits; and
  a plurality of row scramble logic circuits configured to logically operate the offset row address bits and bits of the logical row address to output scrambled row address bits,
  wherein numbers of the row offset storage circuits and the row scramble logic circuits correspond to bit numbers of the logical row address.

5. The semiconductor system of claim 4, wherein the row scramble logic circuits comprise an exclusive OR gate.

6. The semiconductor system of claim 4, wherein the row offset storage circuits comprise a register.

7. The semiconductor system of claim 4, wherein the offset row address bits in the row offset storage circuits are different from each other between different scramble circuits of different semiconductor chips.

8. The semiconductor system of claim 3, wherein the column scramble circuit comprises:
   a plurality of column offset storage circuits configured to store offset column address bits; and
   a plurality of column scramble logic circuits configured to logically operate the offset column address bits and bits of the logical column address to output scrambled column address bits,
   wherein numbers of the column offset storage circuits and the column scramble logic circuits correspond to bit numbers of the logical column address.

9. The semiconductor system of claim 8, wherein the column scramble logic circuits comprise an exclusive OR gate.

10. The semiconductor system of claim 8, wherein the column offset storage circuits comprise a register.

11. The semiconductor system of claim 8, wherein the offset column address bits in the column offset storage circuits are different from each other between different scramble circuits of different semiconductor chips.

12. The semiconductor system of claim 1, wherein the scramble circuit is configured to be selectively driven in response to a bit error test command.

13. A semiconductor system comprising:
   a module substrate;
   a plurality of semiconductor chips mounted on the module substrate, each of the plurality of semiconductor chips including a control block, a first cell region, a second cell region and a third cell region, the first cell region, the second cell region and the third cell region sequentially spaced apart from the control block with the second cell region farther from the control block than the first cell region and the third cell region farther from the control block than the second cell region;
   a module controller configured to provide each of the semiconductor chips with logical addresses and address bit test commands; and
   a plurality of scramble circuits, with a scramble circuit provided for each of the semiconductor chips, the scramble circuits configured to convert the logical addresses into physical addresses using the address bit test commands, wherein the plurality of scramble circuits is configured to output the scramble addresses to be matched to the number of the semiconductor chips for selecting a memory cell located at the first cell region with the number of the semiconductor chips for selecting a memory cell located at the third cell region.

14. The semiconductor system of claim 13, wherein each scramble circuit comprises:
   a row scramble circuit configured to receive a logical row address among the logical addresses and to output a scrambled row address as a physical row address; and
   a column scramble circuit configured to receive a logical column address among the logical addresses and to output a scrambled column address as a physical column address.

15. The semiconductor system of claim 14, wherein the row scramble circuit comprises:
   a plurality of row offset storage circuits configured to store offset row address bits; and
   a plurality of row scramble logic circuits configured to logically operate the offset row address bits and bits of the logical row address to output scrambled row address bits,
   wherein numbers of the row offset storage circuits and the row scramble logic circuits correspond to bit numbers of the logical row address.

16. The semiconductor system of claim 14, wherein the column scramble circuit comprises:
   a plurality of column offset storage circuits configured to store offset column address bits; and
   a plurality of column scramble logic circuits configured to logically operate the offset column address bits and bits of the logical column address to output scrambled column address bits,
   wherein numbers of the column offset storage circuits and the column scramble logic circuits correspond to bit numbers of the logical column address.

* * * * *